March 9, 1926. 1,575,956

L. E. WILLIAMS

AUXILIARY RIM AND TIRE

Filed May 11, 1925

INVENTOR
L. E. WILLIAMS
BY
ATTORNEYS

Patented Mar. 9, 1926.

UNITED STATES PATENT OFFICE.

LELA EARL WILLIAMS, OF BENTON, ILLINOIS.

AUXILIARY RIM AND TIRE.

Application filed May 11, 1925. Serial No. 29,513.

*To all whom it may concern:*

Be it known that I, LELA EARL WILLIAMS, a citizen of the United States, and a resident of Benton, in the county of Franklin and State of Illinois, have invented a new and useful Improvement in Auxiliary Rims and Tires, of which the following is a full, clear, and exact description.

My invention relates to improvements in auxiliary rim and tire, and it consists in the combinations, constructions, and arrangements herein described and claimed.

An object of my invention is to provide an auxiliary rim and tire of the character described which may be quickly disposed upon a vehicle wheel having the standard pneumatic tire rim still in place, for the purpose of taking the place in supporting the vehicle of the standard pneumatic tire when deflated, as through puncture and the like.

A further object of my invention is to provide an auxiliary rim and tire of the character described which may be carried in precisely the same manner as the ordinary spare tire and rim, but which may be applied to the standard rim without removal of the standard rim from the vehicle wheel felly, and without the use of special tools or the like.

A further object of my invention is to provide an auxiliary rim and tire in which particularly novel means is employed for securing the auxiliary rim to the standard rim, and in which actual registration of the two rims is assured.

Other objects and advantages will appear in the following specification, and the novel features of the invention will be particularly pointed out in the appended claims.

My invention is illustrated in the accompanying drawings forming part of this application, in which—

Figures 1, 2:
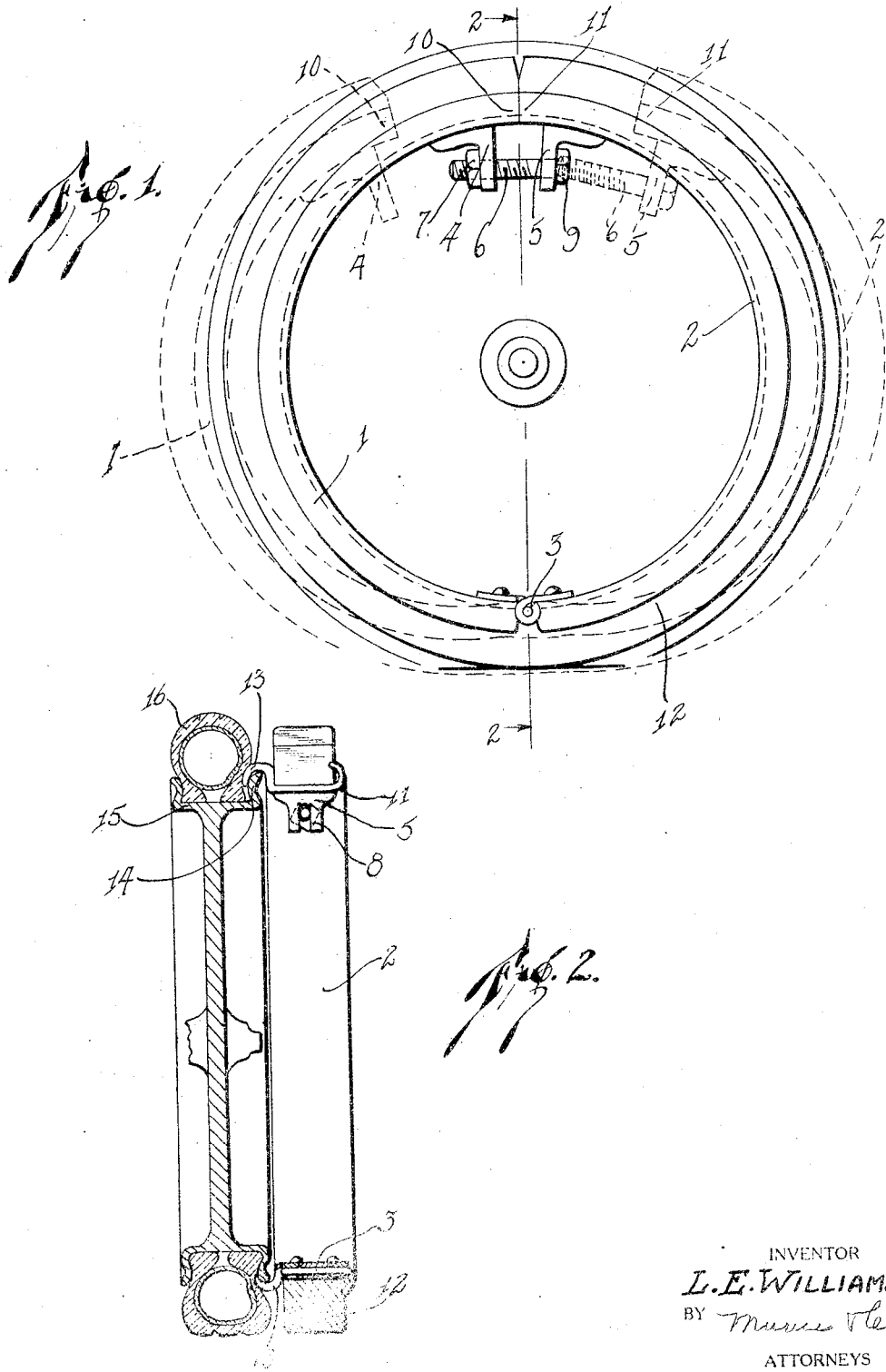
Figure 1 is a front elevation of an embodiment of my invention.
Figure 2 is a sectional view along the line 2—2 of Figure 1.

In carrying out my invention I make use of a pair of semi-annular tire supporting rim members 1 and 2. These semi-annular members are connected together by the provision of a hinge 3 at one end. Each of the members 1 and 2 have inwardly extending lugs 4 and 5 adjacent their free ends.

A bolt 6 is projected through the lug 4 and a nut 7 is disposed upon the bolt which is arranged to bear against the rear side of the lug 4.

The lug 5 is provided with a slot 8 extending longitudinally therethrough by means of which the head portion 9 of the bolt 6 may be engaged with the lug 5 so that upon tightening the lug 7 the lugs 4 and 5 are drawn toward one another, and consequently the free ends 10 and 11 of the semi-annular members 1 and 2 are drawn into contact with one another. A solid rubber tire 12 is disposed upon the rim members 1 and 2, the opposite ends of the tire being in registration with the ends 10 and 11 of the members 1 and 2 so that when the members are in the position shown in Figure 1 the tire 12 has much the same appearance as the ordinary type of endless rubber tire.

The members 1 and 2 each have circumferential engaging portions 13 which are adapted to engage with the flange 14 of a standard pneumatic tire supporting rim 15 (see Figure 2). In this figure I have shown a standard pneumatic tire 16 disposed upon the rim 15, which is shown deflated, as through puncture or the like.

From the foregoing description of the device the operation of the various parts may be readily understood. Let us assume that a vehicle equipped with a rim 15 and standard pneumatic tires 16 is upon the road and at some distance from a repair station, and that the tire 16 is punctured. Instead of removing the tire 16 from the rim 15 and placing a spare pneumatic tire thereon, or instead of repairing the tire 16, I place the auxiliary rim 1—2 into engagement with the rim flange 14 of the rim 15.

This is done by disengaging the bolt 6 from the lug 5 and in moving the members 1 and 2 to the position shown in dotted lines in Figure 1.

The portions 13 of the rims 1 and 2 are then placed in registration with the flange 14 of the rim 15, and the members 1 and 2 brought to the position shown in full lines of Figure 1.

The head 9 of the bolt 6 is then moved into engagement with the lug 5 and the nut 7 tightened upon the bolt. This moves the lugs 4 and 5 toward one another and moves the portions 10 and 11 of the rim members 1 and 2 respectively into contact with one another to securely lock the auxiliary rim and tire upon the standard rim 15. The solid tire 12 thus bears the weight of the vehicle in part, instead of the deflated tire 16, and the vehicle may be driven to a place where repair of the casing 16 may be adequately performed.

I claim:

1. An auxiliary rim and tire of the character described comprising a pair of semi-annular members hingedly secured to one another, a solid resilient vehicle tire disposed on the peripheral walls of said semi-annular members each having portions thereof fashioned to engage with and partially receive the flange of a standard pneumatic tire bearing rim, and means for locking said hingedly connected semi-annular members with their free ends in close contact with one another, whereby said auxiliary rim may be securely held against movement relative to said standard tire bearing rim.

2. An auxiliary rim and tire of the character described comprising a pair of semi-annular members hingedly secured to one another, a solid resilient vehicle tire disposed on the peripheral walls of said semi-annular members each having portions thereof fashioned to engage with and partially receive the flange of a standard pneumatic tire bearing rim, and means for locking said hingedly connected semi-annular members with their free ends in close contact with one another, whereby said auxiliary rim may be securely held against movement relative to said standard tire bearing rim, said means including a bolt and nut carried by one of the semi-annular members and arranged to engage with the opposite member.

3. The combination with a standard pneumatic tire bearing rim of an auxiliary rim consisting of two semi-annular members hingedly mounted to one another, said members having portions fashioned to engage with and receive the flange of said standard rim, a tire carried by said semi-annular members on the peripheral wall thereof, and means for locking said semi-annular members with their free ends in contact with one another, whereby the members may be securely held upon said standard rim.

4. The combination with a standard pneumatic tire bearing rim of an auxiliary rim consisting of two rigid semi-annular members hingedly mounted to one another, said members having portions fashioned to engage with and receive the flange of said standard rim, a tire carried by said semi-annular members on the peripheral wall thereof, and means for locking said semi-annular members with their free ends in contact with one another, whereby the members may be securely held upon said standard rim.

5. The combination with a standard pneumatic tire bearing rim of an auxiliary rim consisting of two rigid semi-annular members hingedly mounted to one another, said members having portions fashioned to engage with and receive the flange of said standard rim, a solid rubber vehicle tire carried by said semi-annular members on the peripheral wall thereof, and means for locking said semi-annular members with their free ends in contact with one another, whereby the members may be securely held upon said standard rim.

LELA EARL WILLIAMS.